United States Patent [19]

Takai et al.

[11] Patent Number: 4,626,939
[45] Date of Patent: Dec. 2, 1986

[54] EJECTION MECHANISM FOR TAPE PLAYER

[75] Inventors: Kazuki Takai; Toshihiro Ikahata; Wataru Watanabe, all of Tokyo, Japan

[73] Assignee: Clarion Co., Ltd., Tokyo, Japan

[21] Appl. No.: 566,575

[22] Filed: Dec. 29, 1983

[30] Foreign Application Priority Data

Dec. 31, 1982 [JP] Japan ............................. 57-228293
Dec. 31, 1982 [JP] Japan ............................. 57-228294

[51] Int. Cl.$^4$ ........................................... G11B 17/04
[52] U.S. Cl. ............................... 360/96.5; 360/96.6
[58] Field of Search ................... 360/96.5, 93, 96.6, 360/96.1

[56] References Cited

U.S. PATENT DOCUMENTS

| 3,669,455 | 6/1972 | Cicatelli | 360/93 |
| 3,669,456 | 6/1972 | Oteki | 360/96.5 |
| 3,972,072 | 7/1976 | Richt | 360/93 |
| 4,510,540 | 4/1985 | Kato | 360/93 |

FOREIGN PATENT DOCUMENTS

| 52-017008 | 2/1977 | Japan | 360/96.5 |
| 58-108058 | 6/1983 | Japan | 360/96.5 |
| 1563081 | 3/1980 | United Kingdom | 360/96.5 |

Primary Examiner—John H. Wolff
Assistant Examiner—Matthew J. Bussan
Attorney, Agent, or Firm—Russell E. Hattis; Stephen R. Arnold

[57] ABSTRACT

An ejection mechanism for a tape player includes a guide arm vertically movably supporting a pack guide, a pack stopper connected to the guide arm for frontward and rearward movement, an ejection link connected to the guide arm, and an inversion spring provided connecting the pack stopper to the ejection link to draw and eject a cassette. The ejection mechanism further includes an ejection member disposed along a lateral wall of the frame and mounted for frontward and rearward movement and biased forward by first revival spring, and an operation member similarly disposed alongside the ejection member and similarly mounted for frontward and rearward movement with respect to the frame and biased forward by second revival spring, and an operation rod coupling the ejection link to the motion operation member. An automatically releasing latch couples the ejection member to the operation member during the inward stroke of the ejection member. At the end of the inward stroke the latch releases to allow the operation member to eject the cassette before return of the ejection member.

2 Claims, 9 Drawing Figures

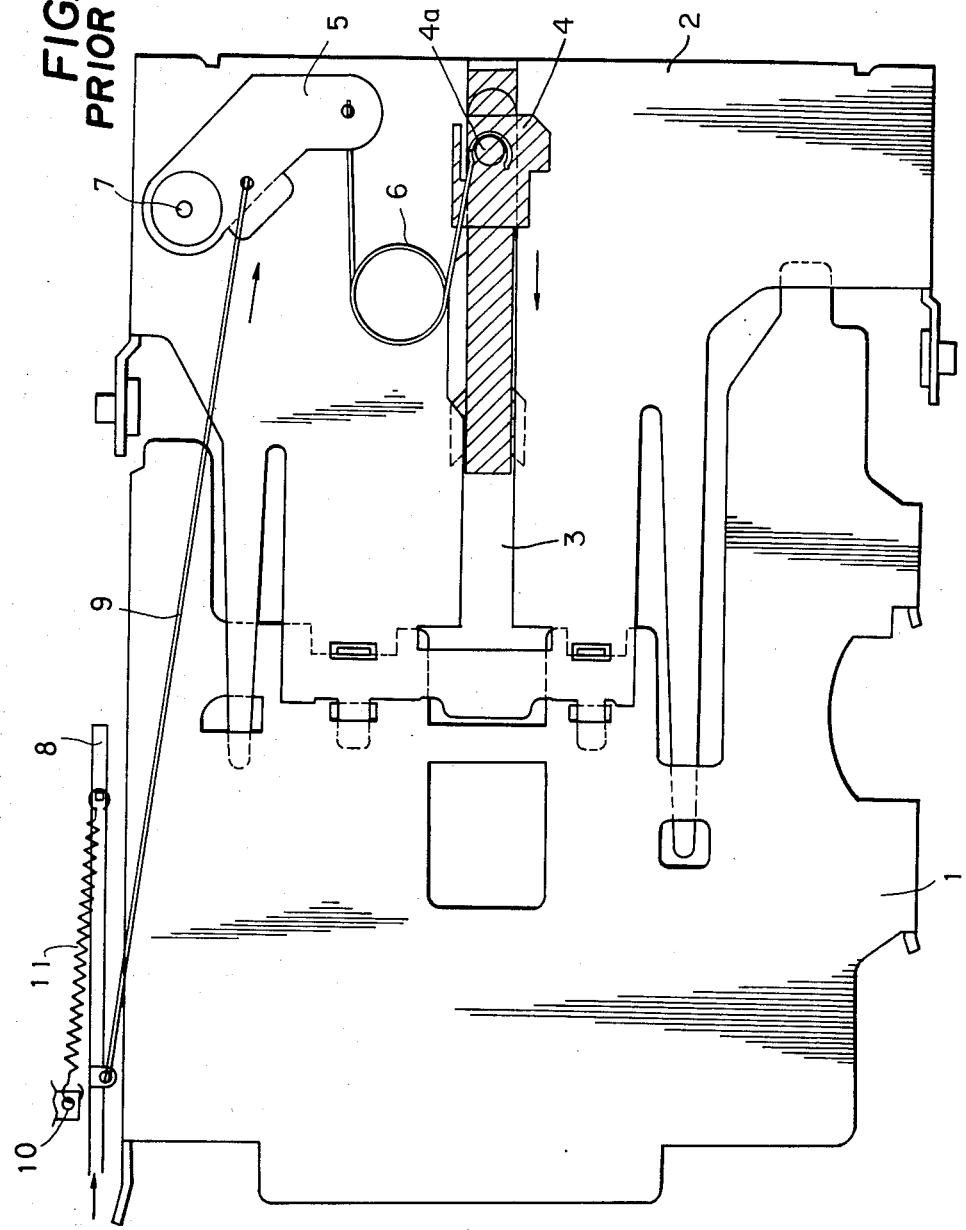

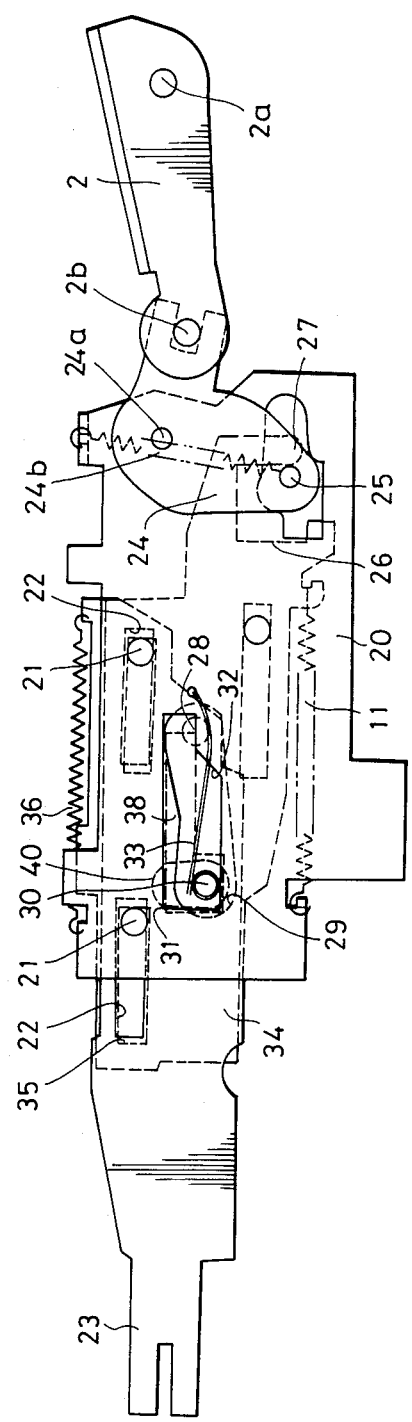

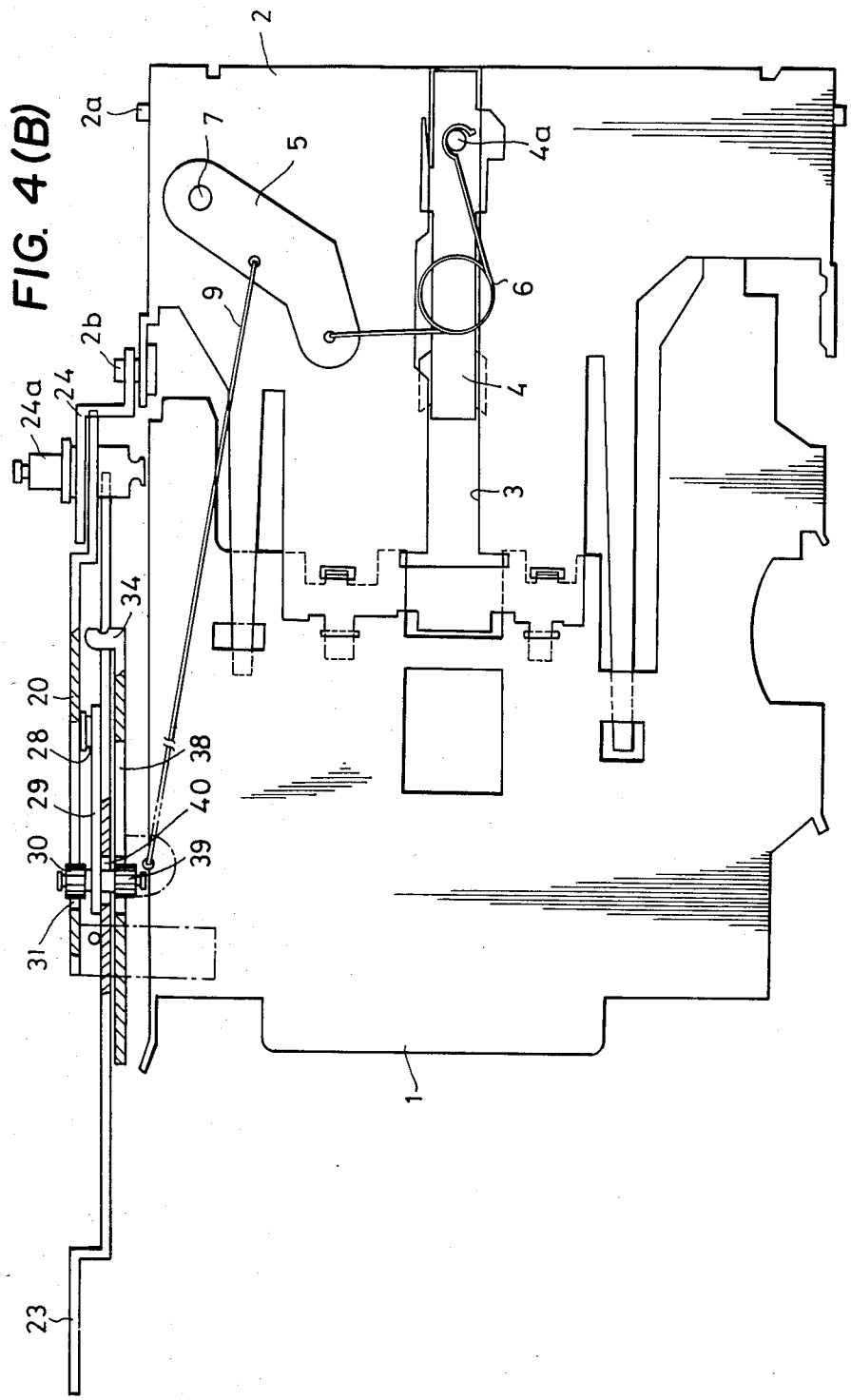

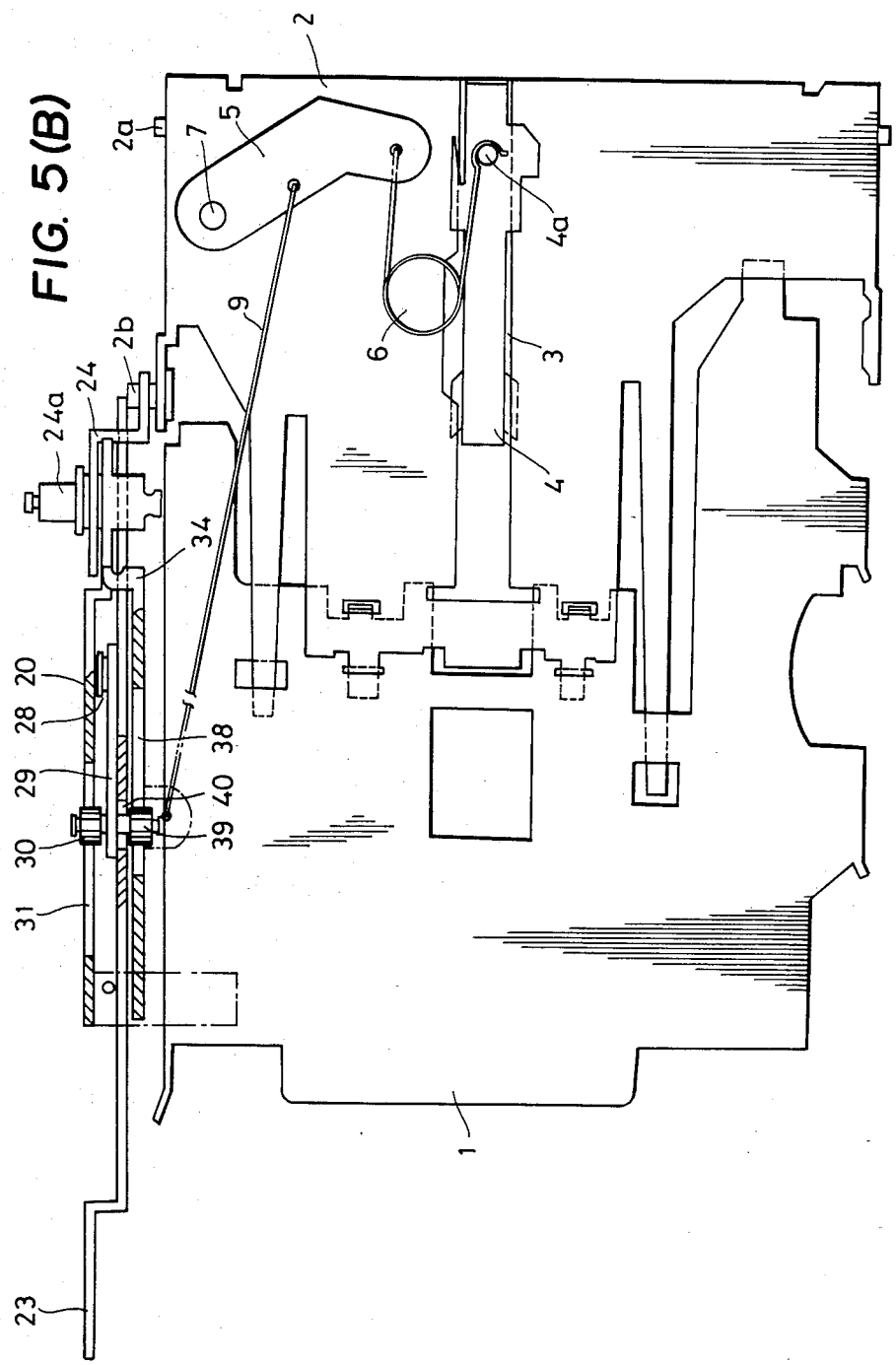

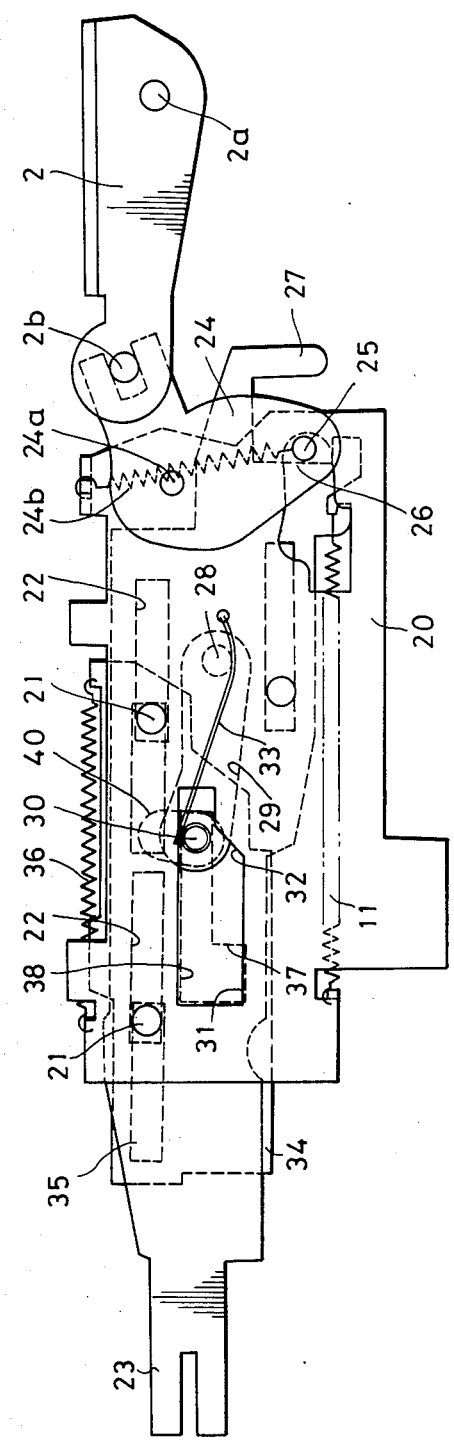

EJECTION MECHANISM FOR TAPE PLAYER

FIELD OF THE INVENTION

This invention relates to an ejection mechanism for ejecting a tape cassette from the play position of a cassette-type tape player.

BACKGROUND OF THE INVENTION

In a cassette-type tape player, a play mode for reproduction or recording is created by engagement of two reel shafts vertically standing on a base plate with shaft bores of a tape cassette. To effect this engagement, various methods are employed depending on whichever direction a cassette is inserted into the tape player. One of the methods is horizontal loading wherein a cassette is horizontally inserted into a pack guide through an insertion opening formed in a front face of a tape player and the pack guide carrying the tape pack is thereafter dropped so that the shaft bores of the tape cassette engage the reel shafts.

In this type of tape player, the pack guide cannot be dropped before the cassette is fully inserted into the pack guide because the reel shaft cannot meet the shaft bores but instead hit the lower face of the tape cassette. It is difficult, however, to fully insert the tape cassette by a finger because the insertion opening is generally so small as the sectional area of the tape cassette and does not permit insertion of a finger, or alternatively, if a finger is inserted through the insertion opening, it may be caught in the tape player when the pack guide drops.

In this connection, there is used a loading mechanism which automatically pulls a halfway manually inserted tape cassette fully into the pack guide. As such loading power, motor driving force or spring force is employed. One type of such loading mechanism employs a single inversion spring which pulls a cassette into the play position and also ejects it therefrom.

FIG. 1 shows a loading and ejection mechanism employing such inversion spring. A guide arm 2 which supports a pack guide 1 is formed on an upper plate thereof with a guide groove 3 extending from front to rear of the tape player and slidably receiving therein a pack stopper 4. A shaft 4a formed on the pack stopper 4 is connected by a torsion-type inversion spring 6 to one end of a link 5 (ejection link). One end of the inversion spring 6 connected to the shaft 4a is configured in a circle rotatable about the shaft 4a whereas the other end is rotatably inserted into a bore formed at said end of the link 5. The other end of the link 5 is pivotally supported by an axle 7. The middle of the link 5 is connected to an ejection member 8 by an operation rod 9 (connection member). The ejection member 8 is connected to a projection 10 of a frame of the tape player by the revival spring 11.

With this arrangement, if a tape cassette is manually inserted halfway into the pack guide 1, it pushes and shifts the pack stopper 4 rearward (to the right in the Figures) of the tape player. The inversion spring 6 is urged to decrease the angle made by the two arms thereof, accordingly. As shown by FIG. 2, when the pack stopper 4 conveys the associated end of the inversion spring 4 behind (to the right of, in the Figures) the other end of the same, i.e. when the shaft 4a of the pack stopper 4 comes behind the front (left, in the Figures) end of the link 5, expansion force of the inversion spring 6 is oriented rearward with respect to said one end of the link 5 which stands still. Due to this expansion force, the pack stopper 4 is urged rearward together with the cassette engaging therewith, thereby effecting automatic loading.

To eject out the tape cassette, the ejection member 8 is manually pushed in. As shown by FIG. 3, the link 5 is urged by the eject lever 8 via the operation rod 9 and rotates about the axle 7 in the counterclockwise direction. The connected end of the inversion spring 6 is therefore compressed and comes behind the other end linked to the pack stopper 4. As the result, expansion force of the inversion spring 6 is directed frontward and urges the pack stopper 4 and the cassette engaging therewith frontward of the tape player. The ejection member 8 is thereafter returned to its original position by the revival spring 11 and causes rearward displacement of the link 5 and the pack stopper 4 connected thereto via the inversion spring 6, thereby effecting automatic ejection of the tape cassette from the pack guide 1.

Thus, the inversion spring type loading and ejection mechanism uses the revival force of the inversion spring which is selectively oriented rearward or frontward of the tape player, depending upon changes of positional relation between the front end of the link 5 and the shaft 4a of the pack stopper 4, thereby effecting automatic full insertion of the tape cassette manually halfway inserted into the pack guide 1 or effecting automatic ejection of the tape cassette from the fully inserted position to the halfway inserted position This type of prior art loading and ejection mechanism, however, involves some problems. Namely, it is only the revival spring 11 that gives the force for pulling out the slightly frontward shifted tape cassette to the ejected position. However, because the ejection force must overcome the friction between the tape cassette and the inner wall of the pack guide 1 or the resistance of a dust-off door covering the cassette insertion opening of the escutcheon, the revival spring 11 must be large. If the revival spring 11 is large, a considerabllly large manual force is required to compress it upon ejecting operation. Particularly at the beginning of the ejecting operation, the manual force must be so large as to also overcome the expansion force of the inversion spring 6 in addition to the revival spring 11.

A further problem of the prior art mechanism is the operative linkage between the ejection member 8 and the pack stopper 4. Namely, since the ejection member 8 and the pack stopper 4 are disposed for simultaneous movement, the cassette is not pulled out of the pack guide 1 merely by the insertion of the ejection member 8. It is ejected out only when the ejection member 8 is released from the manual force and the revival spring 11 is allowed to return to its original length. Therefore, this gives an impression that the ejecting motion is somewhat slow.

OBJECT OF THE INVENTION

It is therefore an object of the invention to provide an ejection mechanism in a tape player which reduces manual force for inserting the ejection lever and also instantly ejects a tape cassette out of the pack guide before the ejection lever returns to the original position.

SUMMARY OF THE INVENTION

The ejection mechanism according to the invention includes an additional operation member which is disposed for simultaneous movement with insertion of the ejection member and for independent movement from the ejection lever after full inversion of the inversion spring, and is linked to the link connected to the inversion spring so that full insertion of the ejection member permits the operation member to immediately return to its front position to displace the tip of the link fixed to the other end of the inversion spring, thereby using both the revival force of the inversion spring and a revival spring force of the operation member to reduce the load to the latter spring and reduce manual force for pushing the ejection lever.

The ejection mechanism is also characterized in that the operation member returning forward independently from the ejection member effects cassette ejection, thereby enabling an immediate ejection by insertion of the ejection member before revival thereof to the forward non-operated position.

BRIEF DESCRIPTION OF THE DRAWINGS

FIG. 3 is a plan view illustrating the prior art mechanism of FIG. 1 wherein ejecting operation is started;

FIG. 4A is a side view of an ejection mechanism embodying the present invention as seen from a frame of the tape player wherein loading operation is started;

FIG. 4B is a plan view of the mechanism of FIG. 4A;

FIG. 5B is a plan view of the mechanism of FIG. 5A;

FIG. 6A is a side view of the mechanism of FIG. 4A wherein ejecting operation is completed.

DETAILED DESCRIPTION OF THE PREFERRED EMBODIMENTS

Figure 1:
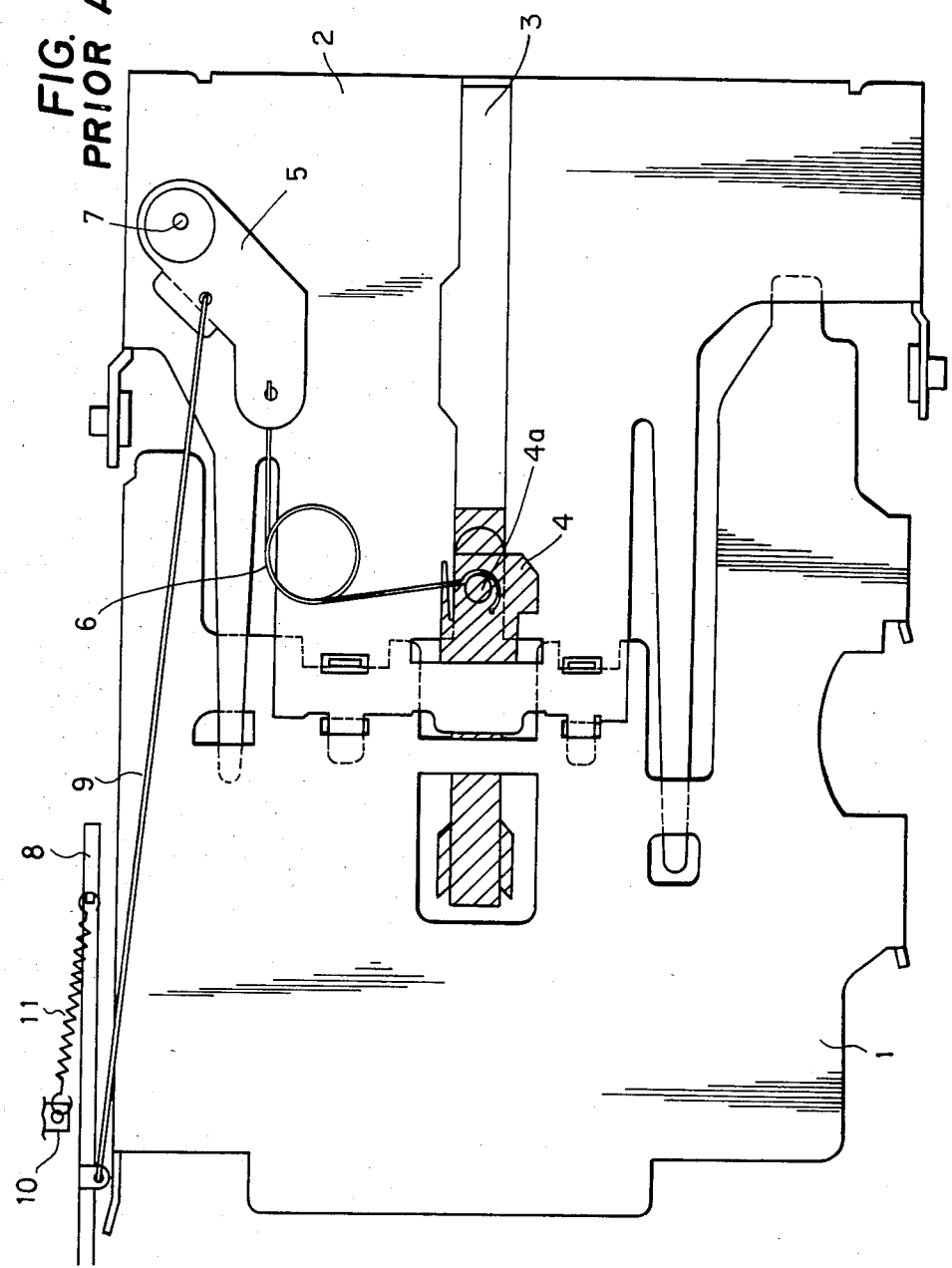
FIG. 1 is a plan view illustrating a prior art loading and ejection mechanism employing an inversion spring wherein a tape cassette is not loaded yet.
Figure 2:
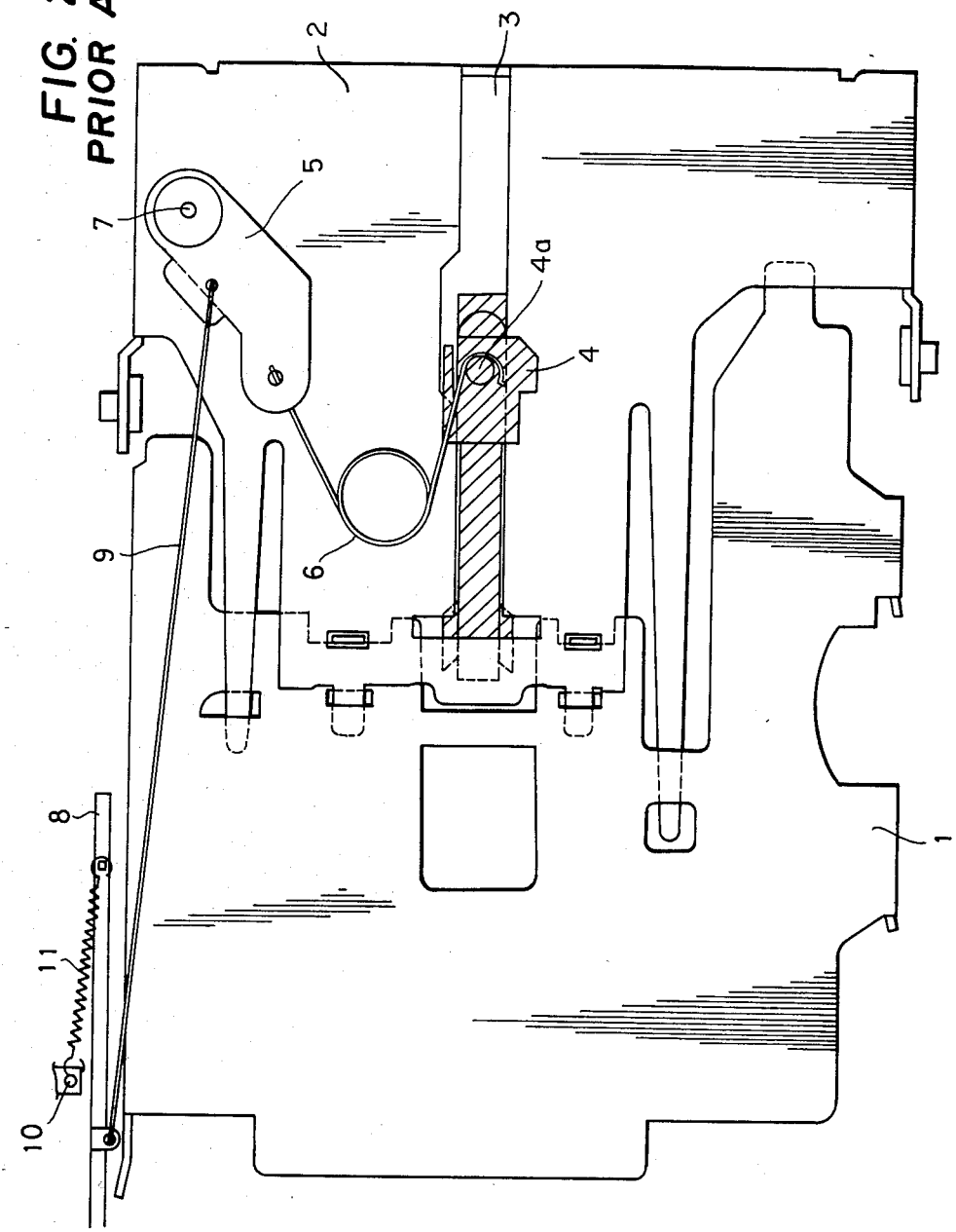
FIG. 2 is a plan view illustrating the prior art mechanism of FIG. 1 wherein a tape cassette is loaded.

The invention will now be described in detail by way of preferred embodiments illustrated in FIG. 4A et seq.

An ejection member 23 is mounted beside a frame 20 for frontward and rearward (left and right, in the Figure) movement thereto by means of guide pins 21 and elongated holes 22. The ejection member 23 is biased frontward by a revival spring 11 provided between the frame and itself. An L-shaped link 24 is pivotally mounted on the frame 20 by an axle 24a and engages at one end thereof with the rear end of the ejection member 23. More specifically, the ejection member 23 is formed at the rear end portion thereof with a forward pressure edge 27 and a rearward pressure edge 26 spaced from each other for engagement with an engagement pin 25 projecting from the L-shaped link 24. A guide arm 2 is vertically pivotal about an axle 2a at the rear end thereof and supports a pack guide 1 to raise and drop it. The guide arm 2 is formed at the front end thereof with a pin 2b which engages a U-shaped end of the L-shaped link 24 remote from the engagement pin 25. The engagement pin 25 of the L-shaped link 24 is connected to an upper edge of the frame by a coil spring 24b.

The ejection member 23 carries at the central portion thereof an axle 28 which pivotally supports a latching link 29 extending frontward therefrom. The link 29 carries at the front end thereof a pin-shaped cam follower 30 which is received in a cam hole 31 formed in the frame 20. The cam hole 31 includes a tapered cam surface 32 gradually sloping up toward the rear end of the cam hole (See FIG. 5A). The cam hole 31 is located so that the front edge thereof contacts the cam follower 30 when the ejection member 23 stays at the foremost position whilst the tapered cam surface 32 contacts the cam follower 30 when the ejection member 23 is almost fully inserted. The link 29 is biased downward by a spring 33 so that the cam follower 30 moves along the lower edge and the tapered cam surface 32 of the cam hole 31.

An operation member 34 for compressing an inversion spring 6 is mounted to the frame 20 so as to sandwich the ejection member 23 therebetween. The operation member 34 is disposed for frontward and rearward movement by means of elongated holes 35 thereof and the guide pins 21. The operation member 34 is biased forward by a revival spring 36 connecting it to the frame 20. An operation rod 9 connects the operation member 34 and the link 5. The operation member 34 is provided with an engagement hole 38 including a step-up bottom edge 37 at the rear half thereof and receiving therein an engagement pin 39 formed on the link 29. The engagement pin 39 may be coaxial with the cam follower 30 and projecting in the opposite direction thereto for passing through an oval insertion hole 40 formed in the ejection member 23 and entering the engagement hole 38 of the operation member 34.

The ejection mechanism having the above-described construction operates as follows.

(1) When the Tape Cassette is in the Play Position (FIGS. 4A and 4B)

When the pack guide 1 is dropped to create the play mode, the ejection member 23 and the link 29 connected thereto are at the foremost positions. So, the cam follower 30 of the link 29 contacts the front edge of the cam hole 31 of the frame 20. The engagement pin 39 of the link 29 is also located to the left of the step-up edge 37. The engagement pin 25 of the L-shaped link 24 is urged frontward by the forward pressure edge 27 of the ejection member 23 and is positioned frontward with respect to the axle 24a. Therefore, the coil spring 24b connecting the engagement pin 25 to the frame 20 biases the L-shaped link 24 in the clockwise direction and gives a downward pressure to the guide arm 2 and the pack guide 1.

Figure 5A:
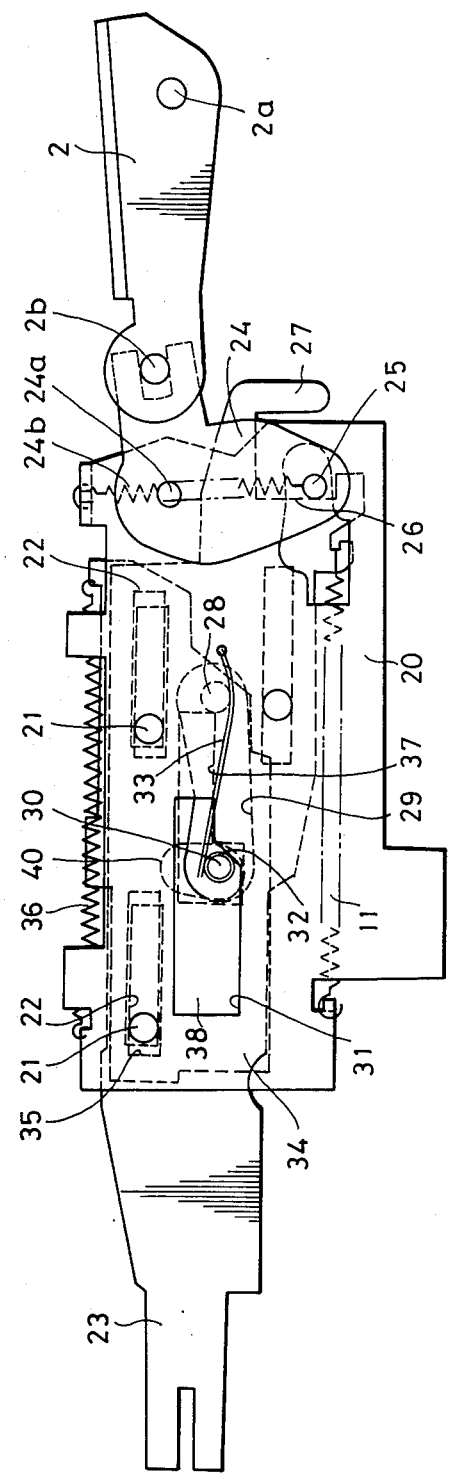
FIG. 5A is a side view of the mechanism of FIG. 4A wherein ejecting operation is started.

(2) Start of Ejecting Operation (FIGS. 5A and 5B)

When the ejection member 23 is pushed, the rearward pressure edge 26 thereof pushes the engagement pin 25 of the L-shaped link 24 rearward. The L-shaped link 24 rotates about the axle 24a in the counterclockwise direction and lifts the guide arm 2 and the pack guide 1.

The cam follower 30 linked to the ejection member 23 moves rearward along the cam hole 31 of the frame 20. Concurrently, the oppositely extending engagement pin 39 moves rearward, urging the operation via engagement with the front vertical face of the step-up edge 37 of the hole 38. Insertion of the ejection member 23 also causes the operation member 34 interlocked therewith to urge the link 5 via the operation rod 9. The link 5 therefore rotates in the counterclockwise direction, compressing the inversion spring 6, up to the position shown in FIG. 5B whereat the free end of the link 5 is parallelly aligned with the axle 4a of the pack stopper 4.

(3) Revival of the Operation Member and Completion of Ejecting Operation (FIGS. 5A and 5B)

Along with further insertion of the ejection member 23, the guide pin 30 climbs the tapered cam 32 of the cam hole 31. The link 29 rotates about the axle 28 in the clockwise direction and the engagement pin 39 is lifted to the height for riding above the step-up edge 37 (See also FIG. 6A) of the engagement hole 38 to allow the operation member 34 to move forward. Due to this, the operation member 34 is vigorously pushed forward by the revival spring 36. Thereby, the operation rod 9 connected to the operation member 34 rotates the link 5 in the clockwise direction, the pack stopper 4 is pushed forward by the revival force of the compressed inversion spring 6, and the cassette in the pack guide 1 is ejected frontward by both the inversion spring 6 and the revival spring 36 of the operation member 34.

Figure 6B:
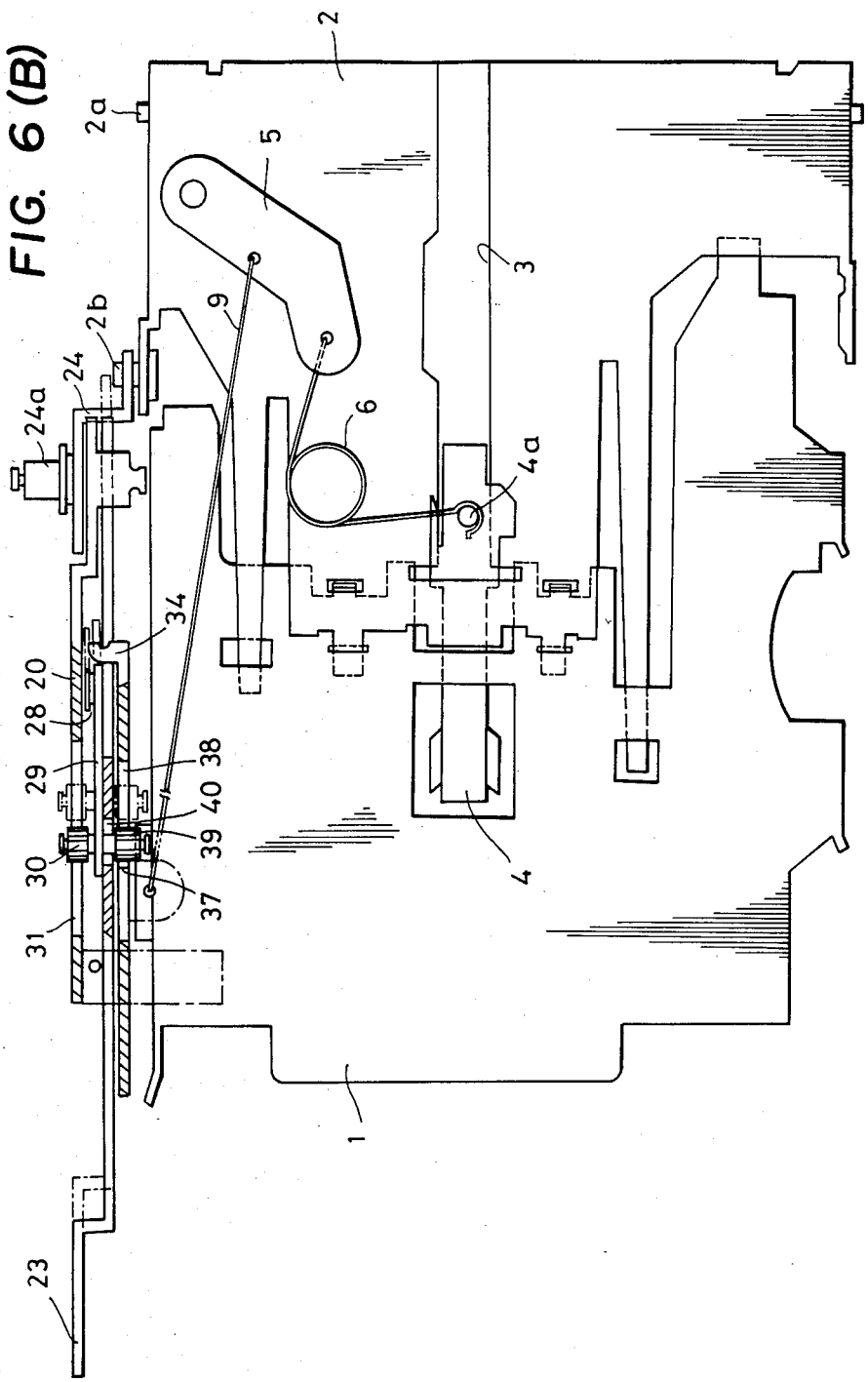
FIG. 6B is a plan view of the mechanism of FIG. 6A.

If the ejection member 23 is still supplied with manual force by the user after the operation member 34 returns to its original position and the cassette is ejected, the ejection member 23 remains in the rearmost position as shown by the dotted lines in FIGS. 6A and 6B. Since the engagement pin 25 of the L-shaped link 24 urged by the ejection member 23 is also located at the rearmost position, the coil spring 24b biases the engagement pin 25 in the counterclockwise direction so that the guide arm 2 and the pack guide 1 are lifted to the highest position permitting ejection of the cassette and are locked there by a lock mechanism not shown. When the ejection member 23 is thereafter released from the manual pressure, the revival spring 11 returns it to a forward position whereat the forward pressure edge 27 contacts the engagement pin 25 of the L-shaped link 24.

As described above, according to the present invention, ejection of a cassette from the pack guide 1 is effected by both the inversion spring 6 and the revival spring 36 of the operation member 34, thereby permitting reduction of the force of the revival spring 11 of the ejection lever 23 and also leading to reduction of manual force for inserting the ejection member 23.

Further, according to the invention, engagement between the ejection member 23 and the operation member 34 is automatically cancelled by the tapered cam surface 32 of the frame 20 upon full insertion of the ejection lever 23, and the operation member 34 is pulled forward together with the pack stopper 4 by the revival spring 36. Therefore, a cassette is instantly ejected just upon full insertion of the ejection lever 23. This is a great advantage as compared to the prior art mechanism wherein a cassette is not actually ejected before a finger is removed from the ejection lever 23.

The embodiments of the invention in which an exclusive property or privilege is claimed are defined as follows:

1. In an ejection mechanism for a tape cassette player having vertically disposed drive shafts for engaging the spool bores of a cassette when said cassette is moved in a downward direction thereonto, said player including a frame positively fixed with respect to movable elements of said ejection mechanism, said ejection mechanism being operable to accept a cassette partially inserted into a forward or front portion of said mechanism onto a pack guide and urged to the rear thereof by the operator, said ejection mechanism including a guide arm pivotally mounted on said frame and coupled to raise said pack guide to an ejecting position responsively to a rotation of said guide arm, a pack stopper mounted for front-to-rear motion along said guide arm, a first or ejection link pivotally mounted on said guide arm, an inversion spring coupling said ejection link to said pack stopper and disposed to withdraw a partially inserted cassette engaging said pack stopper further into said pack guide or to urge said pack stopper to eject said cassette according to the angular position of said ejection link, and an ejection member mounted for reciprocating front-to-rear motion and having associated therewith first biasing means for biasing said ejection member forward, the improvement comprising:

an operation member disposed proximate to said ejection member and mounted for reciprocating front-to-rear motion and having associated therewith second biasing means for biasing said operation member forward; a connection member coupled between said operation member and said ejection link to rotate said ejection link in opposite directions by reciprocating motion of said operation member; releasable latch means configured to lockingly couple said ejection member and operation member together as a coupled pair in the forward positions thereof; latch release means for actuating said latch means to a releasing condition at a terminal portion of the rearward stroke of said coupled pair to release said operation member to be urged to said forward position by said second biasing means to rotate said ejection link by said connection member to assist in the ejection of said cassette; and coupling means for coupling said ejection member to said guide arm so that during an initial portion of the rearward motion of said ejection member said guide arm is pivoted to raise said pack guide to said ejecting position.

2. The ejection mechanism of claim 1 wherein said latch and latch release means include resilient biasing means coupled to a second or latching link pivotally mounted at one end on said ejection member and having cam follower means at the other end, a first camming portion disposed on said frame and configured to engage said cam follower means, a second camming portion disposed on said operation member and configured to engage said cam follower means, said second camming portion being configured with a trapping region for lockingly engaging said cam follower means when urged thereinto by said resilient biasing means when said ejection and operation members are in forward positions, said first camming portion being configured to engagingly move said cam follower means out of said trapping region at said terminal portion of the rearward stroke of said ejection member to release the latching condition between

* * * * *